US010670067B2

United States Patent
Hakes et al.

(10) Patent No.: US 10,670,067 B2
(45) Date of Patent: Jun. 2, 2020

(54) COLLAPSIBLE PIN

(71) Applicant: Lockheed Martin Corporation, Bethesda, MD (US)

(72) Inventors: Heidi L. Hakes, Mansfield, TX (US); Mason Scott Hayes, Fort Worth, TX (US)

(73) Assignee: Lockheed Martin Corporation, Menlo Park, CA (US)

( * ) Notice: Subject to any disclaimer, the term of this patent is extended or adjusted under 35 U.S.C. 154(b) by 119 days.

(21) Appl. No.: 15/843,158

(22) Filed: Dec. 15, 2017

(65) Prior Publication Data
US 2019/0186521 A1    Jun. 20, 2019

(51) Int. Cl.
*F16B 19/02*    (2006.01)
*B64C 1/12*     (2006.01)
*B64F 5/10*     (2017.01)

(52) U.S. Cl.
CPC ............... *F16B 19/02* (2013.01); *B64C 1/12* (2013.01); *B64F 5/10* (2017.01)

(58) Field of Classification Search
CPC ............... F16B 19/02; B64C 1/12; B64F 5/10
See application file for complete search history.

(56) References Cited

U.S. PATENT DOCUMENTS

| | | | |
|---|---|---|---|
| 2,693,732 A | 11/1954 | Durst | |
| 2,865,076 A | 12/1958 | Newton et al. | |
| 2,892,376 A | 6/1959 | Schonfeld | |
| 3,456,547 A | 7/1969 | Strong | |
| 3,922,946 A | 12/1975 | Grayson | |
| 4,478,546 A | 10/1984 | Mercer | |
| 5,378,030 A | 1/1995 | Georgopoulos et al. | |
| 8,444,359 B2 | 5/2013 | Grether et al. | |
| 8,534,974 B2 * | 9/2013 | Smith | F16B 37/0857 411/261 |
| 8,821,061 B2 | 9/2014 | Baus | |
| 9,217,455 B1 | 12/2015 | Woodall, Jr. | |

* cited by examiner

*Primary Examiner* — John C Hong
(74) *Attorney, Agent, or Firm* — Baker Botts L.L.P.

(57) ABSTRACT

An apparatus includes a first pin half, a second pin half opposite the first pin half, and a center pull pin disposed between the first and second pin halves. The first and second pin halves each include a first end, a second end opposite the first end, a bottom portion proximate the second end, and a middle portion adjacent to the bottom portion. The bottom portion extends in a radial direction a first distance. The middle portion extends in the radial direction a second distance less than the first distance. The center pull pin is removable from between the first and second pin halves. The first and second pin halves are collapsible towards each other when the center pull pin is removed from between the first and second pin halves.

11 Claims, 5 Drawing Sheets

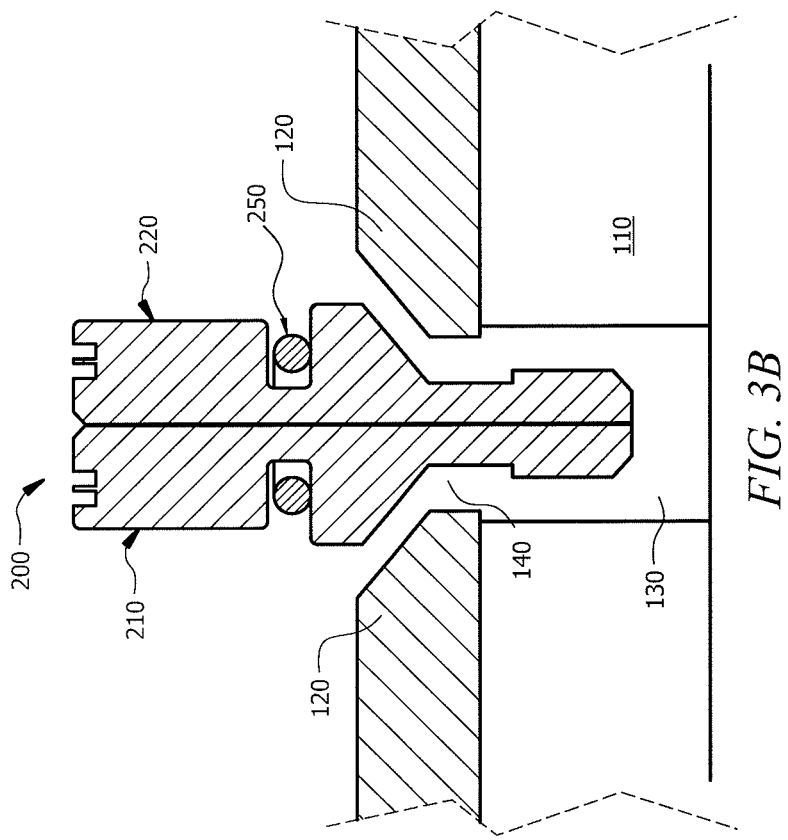
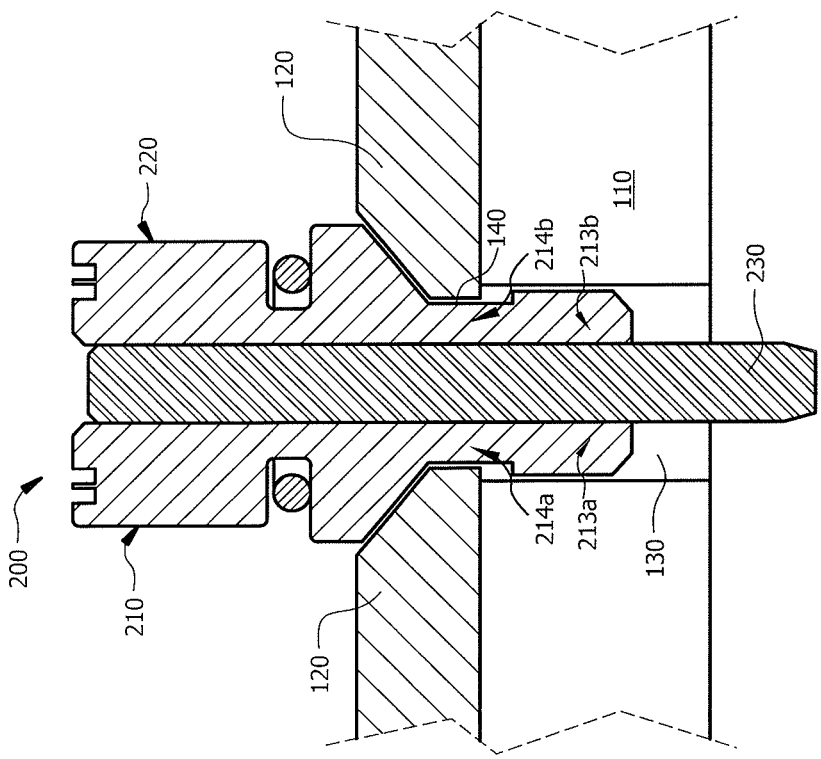
FIG. 3B
FIG. 3A

# COLLAPSIBLE PIN

TECHNICAL FIELD

This disclosure relates in general to fasteners, and more particularly to collapsible pins for affixing panels to structures.

BACKGROUND

Panels may be affixed to certain structures as part of a construction of an outer layer, such as an outer layer of an aircraft. Multiple panels may be placed on the structure before the panels are fastened permanently to the structure to ensure the proper alignment and spacing between the respective panels. Misalignment may occur before and during fastening if the fastener sizes are not perfectly dimensioned to match the holes in the structure. The misalignment may be compounded with the placement of multiple panels on the structure. In some cases, the holes through which the fasteners are inserted are differently sized between the panel and the structure. For example, the panel may have a narrower hole diameter than the holes of the structure. In such cases, locating pins cannot be used because the diameter of the locating pin would be limited by the size of the panel hole, which is smaller than the structure hole. Another conventional technique is to torque sequence the fasteners to reduce misalignment during fastening, but it is an imperfect solution and fails to address the issue of proper alignment before fastening.

SUMMARY OF THE DISCLOSURE

According to one embodiment, an apparatus includes a first pin half, a second pin half opposite the first pin half, and a center pull pin disposed between the first and second pin halves. The first and second pin halves each include a first end, a second end opposite the first end, a bottom portion proximate the second end, and a middle portion adjacent to the bottom portion. The bottom portion extends in a radial direction a first distance. The middle portion extends in the radial direction a second distance less than the first distance. The center pull pin is removable from between the first and second pin halves. The first and second pin halves are collapsible towards each other when the center pull pin is removed from between the first and second pin halves.

According to another embodiment, a method includes providing a panel configured to be affixed to a structure. The method further includes providing a collapsible pin. The collapsible pin includes a first pin half, a second pin half opposite the first pin half, and a center pull pin disposed between the first and second pin halves. The first and second pin halves each include a first end, a second end opposite the first end, a bottom portion proximate the second end, and a middle portion adjacent to the bottom portion. The bottom portion extends in a radial direction a first distance. The middle portion extends in the radial direction a second distance less than the first distance. The center pull pin is removable from between the first and second pin halves. The first and second pin halves are collapsible towards each other when the center pull pin is removed from between the first and second pin halves. The method further includes orienting the panel on structure to align a panel hole defined on the panel with a structure hole defined in the structure. The method further includes inserting the second ends of the first and second pin halves into the panel hole and structure hole. The method further includes inserting the center pull pin between the first and second pin halves. The bottom portions of each of the first and second halves are inserted into the structure hole. A portion of the middle portions are inserted into the panel hole.

According to yet another embodiment, a system includes a structure, a panel, and a collapsible pin. The structure defines one or more structure holes into a surface of the structure. The panel defines one or more panel holes through one or more portions of the panel. The collapsible pin includes a first pin half, a second pin half opposite the first pin half, and a center pull pin disposed between the first and second pin halves. The first and second pin halves each include a first end, a second end opposite the first end, a bottom portion proximate the second end, and a middle portion adjacent to the bottom portion. The bottom portion extends in a radial direction a first distance. The middle portion extends in the radial direction a second distance less than the first distance. The center pull pin is removable from between the first and second pin halves. The first and second pin halves are collapsible towards each other when the center pull pin is removed from between the first and second pin halves. The method further includes orienting the panel on structure to align a panel hole defined on the panel with a structure hole defined in the structure. The bottom portions of the first and second halves of the collapsible pin are disposed within one of the one or more structure holes. The middle portions of the first second halves of the collapsible pin are disposed within one of the one or more panel holes.

The present disclosure may provide numerous advantages. For example, the bottom and middle portions of the first and second pin halves may be configured to expand apart within a structure hole and panel hole when the center pull pin is inserted between the first and second pin halves. By expanding to fill the respective panel and structure holes, the pin halves may secure the panel onto the structure with the center of the panel hole aligned with the center of the structure hole, even when the holes are of different sizes. As another example, the center pull pin may include a ring. The ring may be used to grasp the center pull pin when removing the center pull pin from between the first and second pin halves. The ring may provide further advantages. For example, a portion of the ring may be insertable into a groove defined by the first pin half. Positing the portion of the ring in the groove may secure the center pull pin between the first and second pin halves, such as when the collapsible pin is inserted to affix a panel on a structure. As yet another example, collapsible pins affixing a panel on a structure may be easily removed by removing the center pull pin from between the first and second pin halves and collapsing the first and second pin halves. Once collapsed, the first and second pin halves may be removed from the structure and panel holes even if the bottom portions of the first and second pin halves together would have a diameter bigger than the panel hole.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which:

FIG. 3A is a cross-section side view of the example collapsible pin affixing a panel to a structure, according to certain embodiments;

FIG. 3B is a cross-section side view of the example collapsible pin with the center pull pin removed, according to certain embodiments.

DETAILED DESCRIPTION OF THE DISCLOSURE

Figure 1:
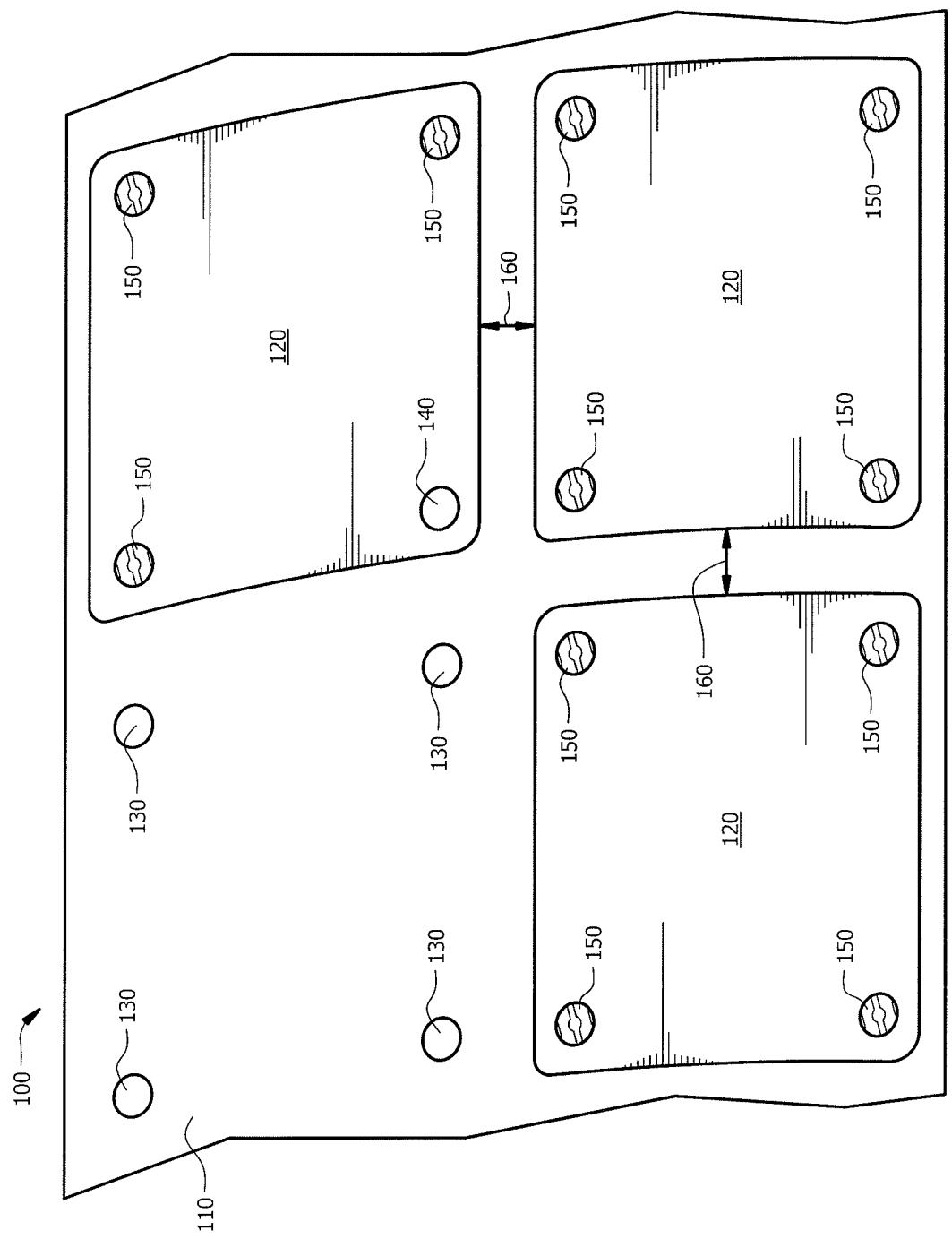
FIG. 1 illustrates an example system including a structure and panels to be affixed to the structure, according to certain embodiments.

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 4, where like numbers are used to indicate like and corresponding parts.

The proper alignment of panels onto a structure presents a particularly difficult challenge for applications requiring tight tolerances for the gaps between adjacent panels. This challenge is compounded with the addition of more panels, such as in large-scale applications or for applications requiring smaller panels. This problem is particularly difficult when the sizes of the holes in the structure are not the same as the holes in the panels. In such cases, convention apparatuses such as locating pins cannot be used. Therefore, there is a need to provide an affixing apparatus that will properly align panels on the structure prior to permanent fastening.

Accordingly, aspects of the present disclosure include an apparatus that includes a first pin half, a second pin half opposite the first pin half, and a center pull pin disposed between the first and second pin halves. The first and second pin halves each include a first end, a second end opposite the first end, a bottom portion proximate the second end, and a middle portion adjacent to the bottom portion. The bottom portion extends in a radial direction a first distance. The middle portion extends in the radial direction a second distance less than the first distance. The center pull pin is removable from between the first and second pin halves. The first and second pin halves are collapsible towards each other when the center pull pin is removed from between the first and second pin halves.

The present disclosure may provide numerous advantages. For example, the bottom and middle portions of the first and second pin halves may be configured to expand apart within a structure hole and panel hole when the center pull pin is inserted between the first and second pin halves. By expanding to fill the respective panel and structure holes, the pin halves may secure the panel onto the structure with the center of the panel hole aligned with the center of the structure hole, even when the holes are of different sizes. As another example, the center pull pin may include a ring. The ring may be used to grasp the center pull pin when removing the center pull pin from between the first and second pin halves. The ring may provide further advantages. For example, a portion of the ring may be insertable into a groove defined by the first pin half. Positing the portion of the ring in the groove may secure the center pull pin between the first and second pin halves, such as when the collapsible pin is inserted to affix a panel on a structure. As yet another example, collapsible pins affixing a panel on a structure may be easily removed by removing the center pull pin from between the first and second pin halves and collapsing the first and second pin halves. Once collapsed, the first and second pin halves may be removed from the structure and panel holes even if the bottom portions of the first and second pin halves together would have a diameter bigger than the panel hole.

Other technical advantages will be readily apparent to one skilled in the art from the following figures, descriptions, and claims. Moreover, while specific advantages have been enumerated above, various embodiments may include all, some, or none of the enumerated advantages.

Figure 4:
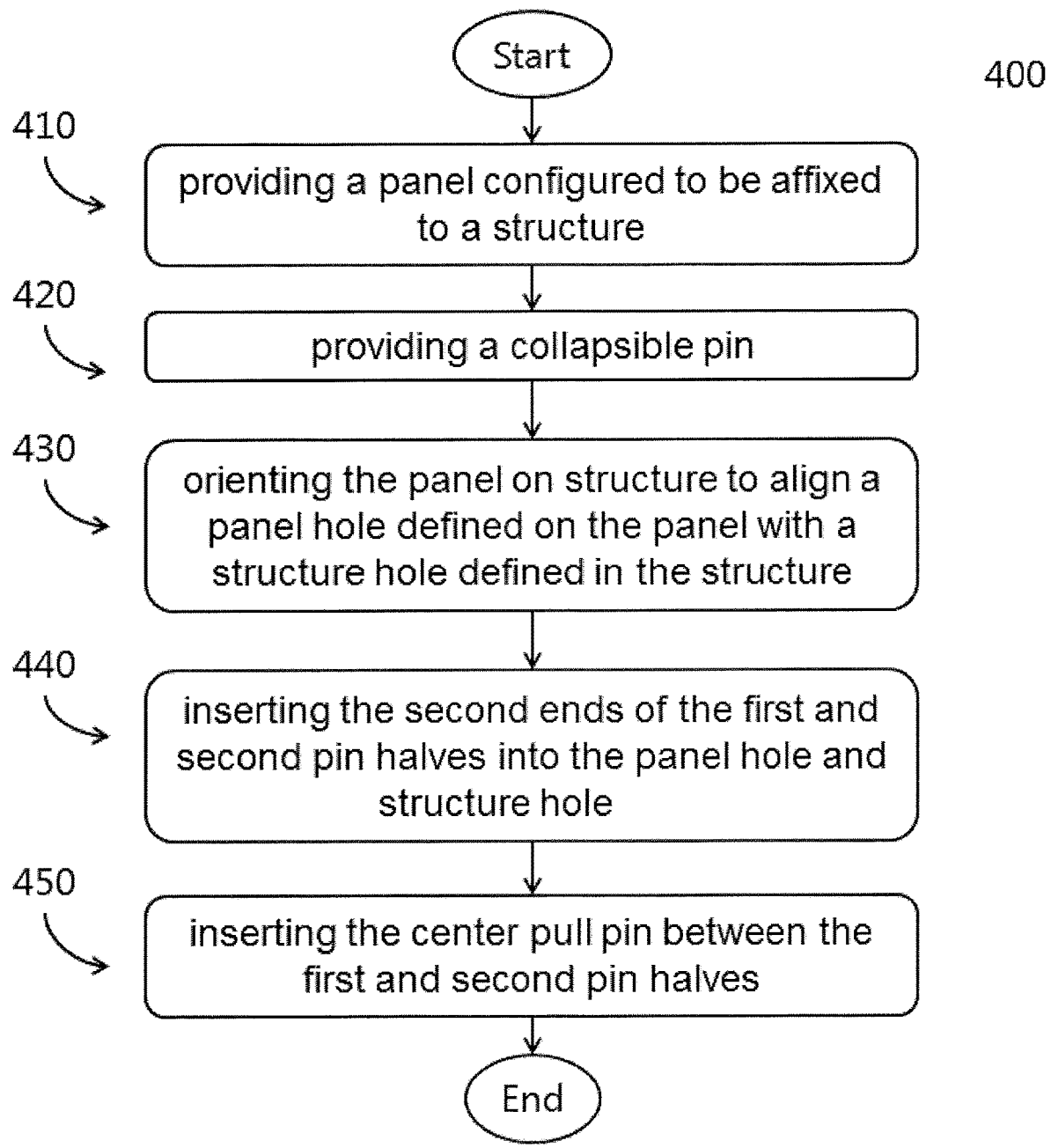
FIG. 4 is a flow chart diagram illustrating an example method of using the example collapsible pin to affix a panel to a structure, according to certain embodiments.

Additional details are discussed in FIGS. 1 through 4. FIG. 1 illustrates an example system including a structure and panels to be affixed to the structure. FIGS. 2A-2D illustrate an example collapsible pin with and without a center pull pin inserted. FIGS. 3A and 3B illustrate cross-section side views of the example collapsible pin used in affixing a panel to a structure. FIG. 4 is a flow chart diagram illustrating an example method of using the example collapsible pin to affix a panel to a structure.

FIG. 1 illustrates an example system 100 including a structure 110 and panels 120 to be affixed to the structure. In certain embodiments, system 100 includes structure 110 and a plurality of panels 120. In some embodiments, structure 110 is a frame of an aircraft and panels 120 are configured to form an outer layer of the aircraft once affixed to the frame of the aircraft. Although the example of an aircraft may be referred throughout, any structure having panels affixed thereon is contemplated in this disclosure.

In certain embodiments, structure 110 may include a plurality of structure holes 130. Panels 120 may include a plurality of panel holes 140 that correspond to respective structure holes 130. For example, one of panels 120 may have corresponding panel holes 140 that match the positions of particular structure holes 130 based on the desired placement of that panel 120 on structure 110. In some embodiments, the number of structure holes 130 matches the total number of panel holes 140 of the plurality of panels 120.

In certain embodiments, panels 120 may be affixed to structure 110 by one or more fastening devices 150. Fastening devices 150 may be permanent fasteners or may be temporary fasteners configured to be removed prior to permanently fastening panels 120 to structure 110. For example, fastening devices 150 may include permanent fasteners such as screws, bolts, rivets, etc. As another example, fastening devices 150 may include temporary fasteners such as locating pins or collapsible pins, such as example collapsible pin 200 discussed in detail below.

Fastening devices 150 may be intended to locate panels 120 in the correct location on structure 110. For example, fastening devices 150 may be configured to align structure holes 130 and panel holes 140 when panels 120 are fastened with fastening devices 150. The positioning of panels 120 may be affected prior to and during the fastening using fastening devices 150, which may lead to misalignment. For example, the fastening of screws as fastening devices 150 may inadvertently move panel 120 being fastened, which may change the relative position of that panel to adjacent panels.

In certain embodiments, there may be a desired distance between adjacent panels 120. As illustrated, adjacent panels 120 may form a gap 160 once fastened to structure 110. The size of gap 160 may have a tolerance that must be met based on the specifications of the particular application or outer layer formed by panels 120. In this manner, if not properly aligned, the size of gaps 160 may exceed or be less than the maximum and minimum distances, respectively. This may require the unfastening and refastening of one or more of panels 120. In some cases, every one of panels 120 must be unfastened, realigned, and then fastened again to structure 110.

In certain embodiments, structure holes 130 may have a larger diameter than panel holes 140. For instance, structure holes 130 may have a different tolerance than panel holes 140, resulting in more variance in structure holes 130. In another example, structure holes 130 may have a larger diameter to provide a more secure fastening of panels 120 to structure 110.

In such embodiments, there is additional potential for misalignment before and during fastening. For example, the placement of panels 120 onto structure 110 prior to fastening may cause misalignment if the temporary fasteners holding panels 120 in place do not properly center panel holes 140 with structure holes 130, e.g., aligning the center of each of the corresponding holes. During permanent fastening, panels 120 may move if the temporary fasteners inserted into the other respective panel holes 130 are not snuggly inserted within each of structure hole 130 and panels holes 130. Accordingly, a temporary fastener or affixing apparatus that is able to expand to match the larger structure holes 130 while still being removable through the smaller panel holes 140 is disclosed herein as an exemplary solution to properly align panels 120 on structure 110 before and during permanent fastening.

Figure 2B:
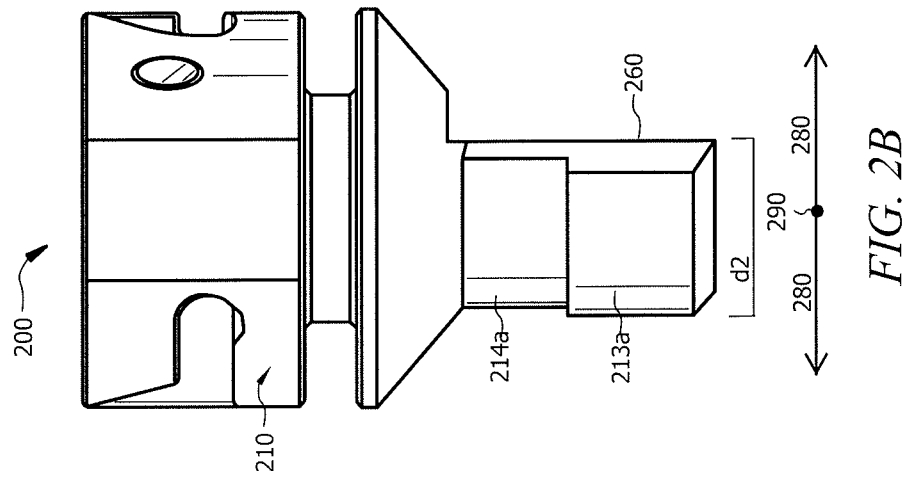
FIG. 2B is a second side view of the pair of pin halves of the example collapsible pin in FIG. 2A, according to certain embodiments.
Figure 2A:
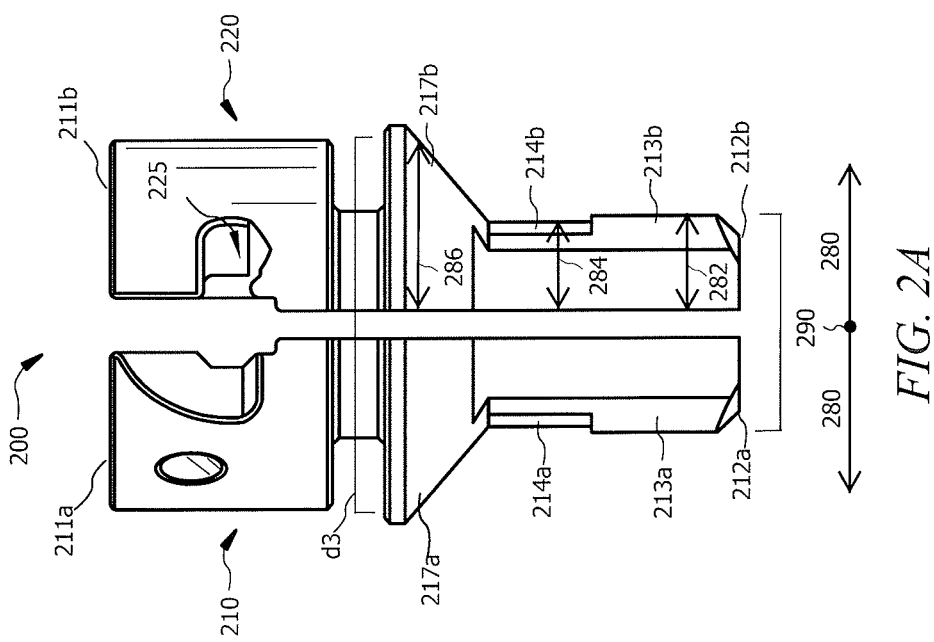
FIG. 2A is a first side view of a pair of pin halves of an example collapsible pin, according to certain embodiments.

FIG. 2A illustrates a collapsible pin 200 without a center pull pin. Collapsible pin 200 may include first pin half 210 and a second pin half 220. In certain embodiments, first pin half 210 and second pin half 220 may be generally semi-circular, such that each defines a matching flat surface and has cross-section that is generally semi-circular at various points along that flat surface.

In certain embodiments, first pin half 210 and second pin half 220 each include a first end 211 (e.g., 211*a* and 211*b*) and a second end 212 (e.g., 212*a* and 212*b*) opposite first end 211. First pin half 210 and second pin half 220 may each further include a bottom portion 213 (e.g., 213*a* and 213*b*) proximate their respective second end 212. Bottom portions 213 may extend in a radial direction 280 a first distance 285. For example, as illustrated, bottom portions 213 may extend horizontally from a middle point 290 from first pin half 210 and second pin half 220.

First pin half 210 and second pin half 220 may each further include a middle portion 214 (e.g., 214*a* and 214*b*) adjacent to respective bottom portions 213. For example, in the illustrated example in FIG. 2A, middle portions 214 may be the portions of first pin half 210 and second pin half 220 directly above bottom portions 213. In certain embodiments, bottom portions 213 are portions of first and second pin halves 210, 220 that are inserted within one of structure holes 130 and middle portions 214 are portions of first and second pin halves 210, 220 that are configured to be disposed through the corresponding one of panel holes 140.

In certain embodiments, middle portions 214 may extend in the radial direction a second distance 284 less than the first distance 282. For example, middle portions 214 may extend less than bottom portions 213 in the same radial direction 280. In this manner, the difference in the distance across of the combination of the first and second pin halves 210, 220 may be less at middle portions 214 than at bottom portions 213. This difference may correspond to the difference between the diameters of panel holes 140 and structure holes 130. For example, the difference in the distance across middle portions 214 and the distance across bottom portions 213 may be approximately equal to the difference between the diameter of panel holes 140 and the diameter of structure holes 130.

FIG. 2B is rotated side view of first and second pin halves 210, 220 rotated 90 degrees from left to right. In certain embodiments, the first and second distances 282, 284 may be the same upon rotation of collapsible pin 200. For example, first and second distances 282, 284 may be the same upon a rotation of collapsible pin 200 for 90 degrees, 180 degrees, 270 degrees, or any arc less than 360 degrees. In this manner, the cross section of first and second pin halves 210, 220, respectively, may be semi-circular for an arc of 90 degrees, 180 degrees, 270 degrees, or any arc less than 360 degrees.

In certain embodiments, bottom portions 213 each include a semi-circular cross-section with a flat section. For example, each of first and second pin halves 210, 220 may include a flat section 260. The inclusion of flat section 260 effectively reduces the distance across first and second pin halves 210, 220 that intersects with the plane defined by flat section 260. For example, the diameter d1 of first and second pin halves 210, 220 measured from left to right in FIG. 2B is less than the diameter d2 of first and second pin halves 210, 220 measured from left to right in FIG. 2A. Flat section 260 may enable bottom portions 213 to be inserted through the smaller diameter of panel holes 140 while simultaneously having a diameter not intersecting with flat section 260 sufficiently large to match the diameter of structure holes 130. Flat section 260 may be sized to match the sizes of panel holes 140 and structure holes 130. For example, a larger difference between the sizes of panel holes 140 and structure holes 130 may require flat section to intersect a larger arc of one or more of first and second pin halves 210, 220. In this manner, first and second pin halves 210, 220 may be more easily inserted and removed from panel holes 140 and structure holes 130.

In certain embodiments, first and second pin halves 210, 220 each include a tapered portion 217 (e.g., 217*a* and 217*b*) between respective first ends 211 and respective middle portions 214. For example, as illustrated, tapered portions 217 may be positioned above middle portions 214. In some embodiments, such as in the illustrated example, at least a portion of tapered portions 217 extends in the radial direction a third distance 286 greater than the second distance 284. For example, the distance across both tapered portions 217 may be greater than the distance across both middle portions 214. Tapered portions 217 may prevent the insertion of the entirety of collapsible pin 200 into one of structure holes 130 and panel holes 140. For example, tapered portions 217 may rest against the side of panel 120 opposite structure 110, thereby preventing the insertion of the portion of collapsible pin 200 between tapered portions 217 and first ends 211. This may be useful in the cases where structure holes 130 extend further than the length of collapsible pin 200.

Figure 2D:
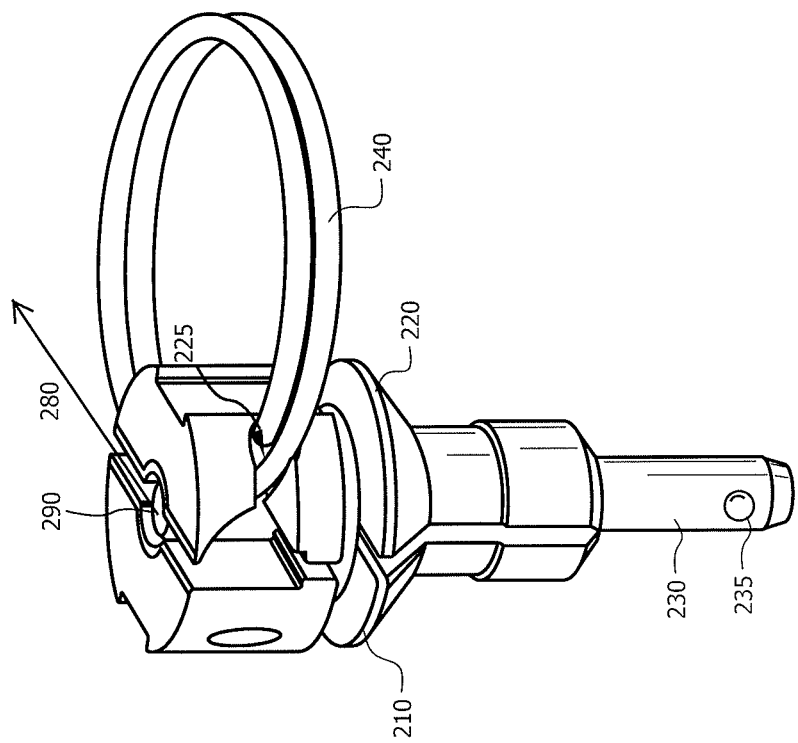
FIG. 2D is a second perspective view of the example collapsible pin with a ring of the center pull pin inserted within a groove of the second pin half, according to certain embodiments.
Figure 2C:
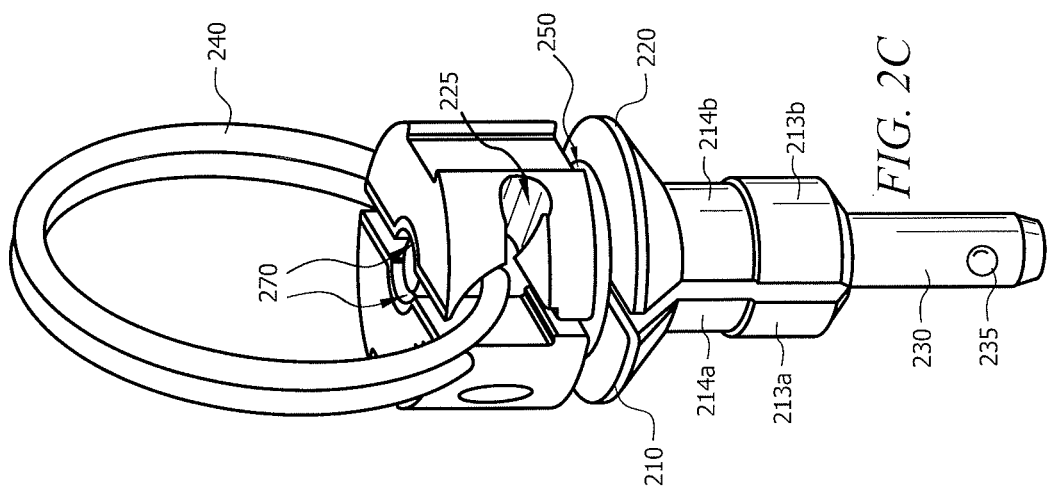
FIG. 2C is a first perspective view of the example collapsible pin with a center pull pin disposed between the pin halves, according to certain embodiments.

FIG. 2C illustrates an example of collapsible pin 200 with a center pull pin 230 disposed between first and second pin halves 210, 220. Center pull pin 230 may be inserted between first and second pin halves 210, 220, thereby expanding first and second pin halves 210, 220 from one another. Inserting center pull pin 230 between first and second pin halves 210, 220 may expand portions of first and second pin halves 210, 220. For example, with center pull pin 230 inserted, the distance across middle portions 214 and bottom portions 213 may be increased.

In certain embodiments, first and second pin halves 210, 220 include grooves 270 on the sides configured to face each other that match the shape of the surface of center pull pin 230. For example, center pull pin 230 may be substantially cylindrical in shape and each of first and second pin halves 210, 220 may include a cylindrical groove that matches the shape of center pull pin 230. In this manner, first and second pin halves 210, 220 may more easily accommodate the insertion of center pull pin 230 between them. Such grooves may further reduce wear and erosion caused by the insertion and removal of center pull pin 230.

In certain embodiments, center pull pin 230 is removable from between first and second pin halves 210, 220. For example, center pull pin 230 may be pulled upwards, through the surrounding portions of first and second pin halves 210, 220 and removed from between first and second pin halves 210. As an illustrative example, center pull pin 230 may be removed from its illustrated position in FIG. 2C, resulting in the collapsible pin 200 illustrated in FIG. 2A. In this manner, center pull pin 230 may be removed from between first and second pin halves 210, 220. The removal of center pull pin 230 may enable first and second pin halves 210, 220 to be collapsed towards one another, because there is no longer an intervening portion of center pull pin 230. Accordingly, collapsible pin 200 is able to expand and collapse based on the insertion and removal of center pull pin 230 between first and second pin halves 210, 220.

In certain embodiments, center pull pin 230 includes a ring 240. For example, ring 240 may be coupled to center pull pin 230 through a hole of center pull pin 230. Ring 240 may be positioned proximate first ends 211 of the first and second pin halves 210, 220 when center pull pin 230 is disposed between the first and second pin halves 210, 220, as illustrated in FIG. 2C. Ring 240 may be used to remove or otherwise grasp center pull pin 230. For example, an operator or installer may remove center pull pin 230 from collapsible pin 200 by pulling upwards on ring 240. Ring 240 may also allow an installer to easily pick up or handle center pull pin 230. In this manner, ring 240 may be coupled to center pull pin 230 to enhance the usability of collapsible pin 200 during insertion and removal of center pull pin 230.

Various embodiments of collapsible pin 200 may include other features that improve the usability and functioning of collapsible pin 200. For example, in certain embodiments, one or more of first and second pin halves 210, 220 may include a ring groove 225. In the illustrated examples, second pin half 220 defines ring groove 225 proximate first end 221. Ring groove 225 may be configured to receive a portion of ring 240.

FIG. 2D is a second perspective view of the example collapsible pin 200 with a portion of ring 240 inserted within ring groove 225 of second pin half 220. In certain embodiments, ring 240 is configured to prevent the removal of center pull pin 230 from between first and second pin halves 210, 220 when ring 240 is inserted into ring groove 225. For example, the insertion of a portion of ring 240 inside ring groove 225 may effectively "lock" center pull pin 230 between first and second pin halves 210, 220. As a result, incidental contact or accidental impacts or other forces may not dislodge center pull pin 230 when ring 240 is engaged with ring groove 225. In this manner, collapsible pin 200 may be more secure when used to affix panels 120 onto structure 110, even when there are other forces acting on panels 120 or structure 110, such as vibrational forces when fastening panels 120.

Another issue that may arise in using collapsible pin 200 may be the separation of first pin half 210 from second pin half 220. For example, when center pull pin 230 is removed, first pin half 210 may separate from second pin half 220 and falling through structure hole 130 or onto the installation floor. In certain embodiments, collapsible pin 200 may include a band 250 surrounding a portion of first and second pin halves 210, 220 to keep first and second pin halves 210, 220 together. For example, band 250 may provide a compressive force pushing first and second pin halves 210, 220 towards one another when center pull pin 230 is removed. In some embodiments, band 250 may include an O-ring, an elastic band, or any other band capable of holding first and second pin halves 210, 220 together.

In certain embodiments, center pull pin 230 may include a ball lock 235. For example, center pull pin 230 may include ball lock 235 on a portion of center pull pin 230 configured to be inserted through first and second pin halves 210, 220. In this manner, a more secure insertion of center pull pin 230 may be provided. For example, ball lock 235 may prevent the removal of center pull pin 230 from between first and second pin halves 210, 220 without engaging some unlocking mechanism on center pull pin 230, such as a button or pressable portion of center pull pin 230. Although illustrated with ball lock 235, in some embodiments, center pull pin 230 may have no ball lock 235 or another mechanism for securing center pull pin 230 from between first and second pin halves 210, 220.

FIG. 3A is a cross-section side view of an example collapsible pin 200 affixing one of panels 120 to structure 110. As illustrated, collapsible pin 200 has been inserted into structure hole 130 and through panel hole 140. Bottom portions 213 are adjacent the interior of structure hole 130 and middle portions 214 are adjacent the interior of panel hole 140. The insertion of center pull pin 230 causes collapsible pin 200 to expand in both structure hole 130 and panel hole 140, thereby pushing bottom portions 213 against the insides of structure hole 130 and middle portions 214 against the insides of panel hole 140. In this manner, the insertion of center pull pin 230 allows collapsible pin 200 to secure panel 120 onto structure 110. Because the distances across bottom portions 213 and middle portions 214 match the diameters of structure hole 130 and panel hole 140, respectively, the structure and panel holes 130, 140 are properly aligned, causing panel 120 to be properly aligned on structure 110.

FIG. 3B illustrates a cross-section side view of an example collapsible pin 200 with center pull pin 230 removed. For removing panel 120 or prior to installing a permanent fastener, collapsible pin 200 may be removed from structure hole 130 and panel hole 140. FIG. 3B illustrates collapsible pin 200 without center pull pin 230 and where first and second pin halves 210, 220 are collapsed towards each other. The collapse of first and second pin halves 210, 220 reduces the effective width of both bottom portions 213 and middle portions 214, which are inserted within structure and panel holes 130, 140. In certain embodiments, the effective width of bottom portions 214 may be reduced by collapsing first and second pin halves 210, 220 in order to remove collapsible pin 220. For example, the effective width of bottom portions 214 may be reduced to a width of less than the diameter of panel hole 140, enabling the removal of collapsible pin 200.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components.

FIG. 4 illustrates an example method 400 of using example collapsible pin 200 to affix one of panels 120 to structure 110. At step 410, a panel, such as one of panels 120, is provided. The panel may be configured to be affixed to a structure, such as structure 110. In certain embodiments, the panel is one of a plurality of aircraft panels configured to be affixed to a frame of the aircraft.

At step 420, a collapsible pin, such as collapsible pin 200, is provided. One or more collapsible pins may be provided. For example, a number of collapsible pins may be provided equal to the number of holes to be filled, such as the number of holes on the panel or on the structure.

At step 430, the panel is oriented on the structure. The panel may be oriented to align a hole in the panel with a hole in the structure. For example, a panel may be configured to be placed at a certain position on the structure. The panel may be oriented such that it is properly aligned to match the alignment of the respective holes. Once aligned, the panel may be affixed to the structure.

At step 440, second ends 212 of first and second pin halves 210, 220 of collapsible pin 220 are inserted into the structure and panel holes. For example, center pull pin 230 may be removed from first and second pin halves 210, 220 prior to inserting collapsible pin into the structure and panel holes. In this manner, first and second pin halves 210, 220 may be collapsible prior to insertion such that the width is reduced to enable the insertion of second ends 212 within the holes. Once inserted, collapsible pin may be stabilized inside the holes.

At step 450, center pull pin 230 may be inserted between first and second pin halves 210, 220. The insertion of center pull pin 230 may expand the respective portions of collapsible pin 200 into the structure and panel holes. In this manner, collapsible pin 200 may secure panel 120 onto structure 110.

Modifications, additions, or omissions may be made to method 400 depicted in FIG. 4. Any steps may be performed in parallel or in any suitable order.

Furthermore, method 400 may include more, fewer, or other steps. For example, method 400 may include steps for removing collapsible pin 200 from the structure and panel holes. For example, method 400 may further include the steps of removing center pull pin 230 from between first and second pin halves 210, 220 after step 450. In some embodiments, this step may include pulling center pull ring 230 by ring 240 coupled to center pull ring. Method 400 may further include collapsing first and second pin halves 210 towards each other. In this manner, the width of collapsible pin 200 may be reduced. Method 400 may further include the step of removing the inserted portions of first and second pin halves 210 from the structure hole and panel hole. In this manner, collapsible pin 200 may be removed to allow the removal of the panel or for the installation of a permanent fastener.

In certain embodiments, method 400 may further include the step of positioning, after inserting center pull pin 230 between first and second pin halves 210, 220, a portion of ring 240 into ring groove 225. This step may further secure collapsible pin 200 within the structure and panel hole and prevent the removal of center pull pin 230 from between first and second pin halves 210, 220. In some embodiments, method 400 may further include the step of removing the inserted portion of ring 240 from ring groove 225. In this manner, center pull pin 230 may then be removed.

In certain embodiments, there may be more than one pair of structure and panel holes. In such cases, multiple collapsible pins 200 may be used to secure the panel. In certain embodiments, method 400 may further include repeating steps 410, 440, and 450 for a second collapsible pin 200 in addition to the first collapsible pin. In this manner, a panel with multiple holes may be secured to the structure 110 using a plurality of collapsible pins 200.

Additionally, while various components of system 100 and collapsible pin 200 were discussed in relation to the steps in method 400, the steps of method 400 may be taken using any suitable component or combination of components of system 100 and/or collapsible pin 200.

The present disclosure may provide numerous advantages. For example, the bottom and middle portions of the first and second pin halves may be configured to expand apart within a structure hole and panel hole when the center pull pin is inserted between the first and second pin halves. By expanding to fill the respective panel and structure holes, the pin halves may secure the panel onto the structure with the center of the panel hole aligned with the center of the structure hole, even when the holes are of different sizes. As another example, the center pull pin may include a ring. The ring may be used to grasp the center pull pin when removing the center pull pin from between the first and second pin halves. The ring may provide further advantages. For example, a portion of the ring may be insertable into a groove defined by the first pin half. Positing the portion of the ring in the groove may secure the center pull pin between the first and second pin halves, such as when the collapsible pin is inserted to affix a panel on a structure. As yet another example, collapsible pins affixing a panel on a structure may be easily removed by removing the center pull pin from between the first and second pin halves and collapsing the first and second pin halves. Once collapsed, the first and second pin halves may be removed from the structure and panel holes even if the bottom portions of the first and second pin halves together would have a diameter bigger than the panel hole.

Other technical advantages will be readily apparent to one skilled in the art from the following figures, descriptions, and claims. Moreover, while specific advantages have been enumerated above, various embodiments may include all, some, or none of the enumerated advantages.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus, comprising;
a first pin half;
a second pin half opposite the first pin half wherein the first and second pin halves each comprise;
a first end;
a second end opposite the first end;
a bottom portion proximate the second end and extending in a radial direction a first distance; and
a middle portion adjacent to the bottom portion and extending in the radial direction a second distance less than the first distance; and
a center pull pin disposed between the first and second pin halves;
wherein:
the center pull pin is removable from between the first and second pin halves;
the first and second pin halves are configured to collapse towards each other when the center pull pin is removed from between the first and second pin halves;
the first pin half defines a groove configured to receive a portion of the ring of the center pull pin; and
the portion of the ring of the center pull pin is configured to prevent the removal of the center pull pin from between the first and second pin halves when inserted into the groove of the first pin half.

2. The apparatus of claim 1, wherein the center pull pin comprises a ring, wherein the ring is proximate the first ends of the first and second pin halves when the center pull pin is disposed between the first and second pin halves.

3. The apparatus of claim 1, wherein the first and second pin halves each comprise a tapered portion between the respective first end and respective middle portion, wherein the tapered portion extends in the radial direction a third distance greater than the second distance.

4. The apparatus of claim 1, further comprising a band configured to hold the first and second pin halves together when the center pull pin is removed from between the first and second pin halves.

5. The apparatus of claim 1, wherein the bottom portions of the first and second pin halves each comprise a semicircular cross-section with a flat section.

6. The apparatus of claim 1, wherein the center pull pin comprises a ball lock, wherein the ball lock is opposite the first ends of the first and second pin halves when the center pull ring is disposed between the first and second pin halves.

7. A system comprising:
a structure defining one or more structure holes into a surface of the structure;
a panel defining one or more panel holes through one or more portions of the panel;
a collapsible pin, comprising:
a first pin half;
a second pin half opposite the first pin half, wherein the first and second pin halves each comprise:
a first end;
a second end opposite the first end;
a bottom portion proximate the second end and extending in a radial direction a first distance; and
a middle portion adjacent to the bottom portion and extending in the radial direction a second distance less than the first distance; and
a center pull pin disposed between the first and second pin halves;
wherein;
the center pull pin is removable from between the first and second pin halves; and
the first and second pin halves are configured to collapse towards each other when the center pull pin is removed from between the first and second pin halves;
wherein:
the bottom portions of the first and second halves of the collapsible pin are disposed within one of the one or more structure holes;
the middle portion of the first second halves of the collapsible pin are disposed within one of the one or more panel holes;
the first pin half defines a groove configured to receive a portion of the ring of the center pull pin; and
the portion of the ring of the center pull pin is configured to prevent the removal of the center pull pin from between the first and second pin halves when inserted into the groove of the first pin half.

8. The system of claim 7, wherein the center pull pin of the collapsible pin comprises a ring, wherein the ring is proximate the first ends of the first and second pin halves when the center pull pin is disposed between the first and second pin halves.

9. The system of claim 7, wherein:
the first and second pin halves of the collapsible pin each comprise a tapered portion between the respective first end and respective middle portion, wherein the tapered portion extends in the radial direction a third distance greater than the first distance; and
wherein the tapered portions of the first and second pin halves of the collapsible pin abut a side of the panel opposite the structure when the collapsible pin is disposed through one of the one or more panel holes and through one of the one or more structure holes.

10. The system of claim 7, wherein:
diameter of the one or more structure holes is larger than a diameter of the one or more panel holes; and
a distance measured across the bottom portions of both the first and second halves of the collapsible pin is approximately the same as the diameter of the one or more structure holes when the center pull pin is disposed between the first and second halves.

11. The system of claim 7, further comprising a second collapsible pin, wherein the second collapsible pin is inserted through one of the one or more panel holes and one of the one or more structure holes.

* * * * *